March 15, 1966 P. W. CLARKE 3,241,043

THYRATRON TUBE REPLACEMENT UNIT EMPLOYING A ZENER DIODE LIMITING THE INVERSE VOLTAGE ACROSS A GATING TRANSISTOR

Filed Dec. 22, 1961 2 Sheets-Sheet 1

INVENTOR
P. W. CLARKE
BY R. B. Ardis
ATTORNEY

INVENTOR
P. W. CLARKE
BY R. B. Ardis
ATTORNEY

United States Patent Office 3,241,043
Patented Mar. 15, 1966

3,241,043

THYRATRON TUBE REPLACEMENT UNIT EMPLOYING A ZENER DIODE LIMITING THE INVERSE VOLTAGE ACROSS A GATING TRANSISTOR

Patrick W. Clarke, Jackson Heights, N.Y., assignor to Bell Telephone Laboratories, Incorporated, New York, N.Y., a corporation of New York Filed Dec. 22, 1961, Ser. No. 161,551
8 Claims. (Cl. 323—22)

This invention relates to electron tube replacement units and more particularly to solid state thyratron tube replacement units.

The prior art is abundant in high power supplies wherein thyratrons are used as control elements. The enormous amounts of power handled by the thyratrons results in a relatively short tube life span which, in turn, leads to considerable idle equipment time, replacement, and maintenance costs. The annual cost of such manitenance in a telephone system where much of the equipment is at remote unattended locations is staggering. Thus, it is desirable to replace the thyratron tubes in existing locations, as well as in new applications, with reliable, long-life solid state units.

Althoughf the solid state pnpn device (controlled rectifier as described, for example, in the paper, "A Silicon Controlled Rectifier—Its Characteristics and Ratings—I," D. K. Bisson and R. F. Dyre, paper 8–1248, American Institute of Electrical Engineers) is generally referred to as a solid state thyratron, attempts to substitute controlled rectifiers directly for thyratrons have not been successful. The major obstacle appears to be that the gate current required to cause breakover at a specified voltage in a controlled rectifier is relatively large and variable when compared to the breakdown grid voltage and current of a comparable thyratron. It should be noted that although in making the comparison of thyratrons to controlled rectifiers the analogy of the thyratron breakdown voltage to the breakover voltage of the controlled rectifier is commonly used, this appears to the somewhat fallacious, since the breakover voltage of the controlled rectifier is very sensitive to temperature and varies widely from device to device. An additional problem arises in that the maximum niverse voltage of a controlled rectifier is somewhat less than that of a comparable thyratron tube.

It is, therefore, the object of this invention to provide a solid-state thyratron tube replacement unit to reduce the idle equipment time, replacement and maintenance costs of equipments utilizing thyratron tubes.

In accordance with this object it has been found that it is possible to replace the thyratron tubes in all equipments with a universal solid-state unit. Such a unit, however, achieves its universality only at the expense of excess components for any given application. To avoid this surplusage and the inherent extra cost, two solid-state units are preferred; one to be used whenever the thyratron is phase controlled by the external circuitry and the other when the thyratron is magnitude controlled by the external circuitry, In phase controlled circuitry, the phase difference of an alternating-current input signal and an alternating-current reference signal control the thyratron breakdown, whereas in magnitude controlled circuitry the breakdown is controlled by a direct-current voltage which varies over a small range for control. This application relates to the solid-state phase controlled thyratron replacement unit. A unit such as the phase controlled unit of this application might, for example, be used to replace the thyratron tubes in a circuit such as the one disclosed by United States Patent 2,619,626, F. W. Anderson, issued November 25, 1952. A copending application of J. K. Mills, Serial No. 161,553, assigned to the same assignee and filed concurrently with this application, discloses the solid-state magnitude controlled thyratron replacement unit. It has been found that these solid state units increase the over-all efficiency of the associated circuitry.

Briefly, a thyratron phase control replacement unit embodying the present invention comprises a circuit interrupter means (controlled rectifier) which is gated either by an inexpensive transistor or an equivalent element to simulate thyratron tube characteristics. The transistor, which is biased at a constant potential, provides sufficient gate current stabilization to insure the "firing" of the control rectifier thereby overcoming the controlled rectifier gate current problem discussed heretofore. The transistor biasing scheme also provides inverse voltage protection for the controlled rectifier. Other means including asymmetrically conducting device-resistor combinations and a flyback device are additionally employed to reduce the inverse voltages appearing across the controlled rectifier.

Other objects and features of the present invention will become apparent upon consideration of the following detailed description when taken in connection with the accompanying drawings in which.

Figure 4:
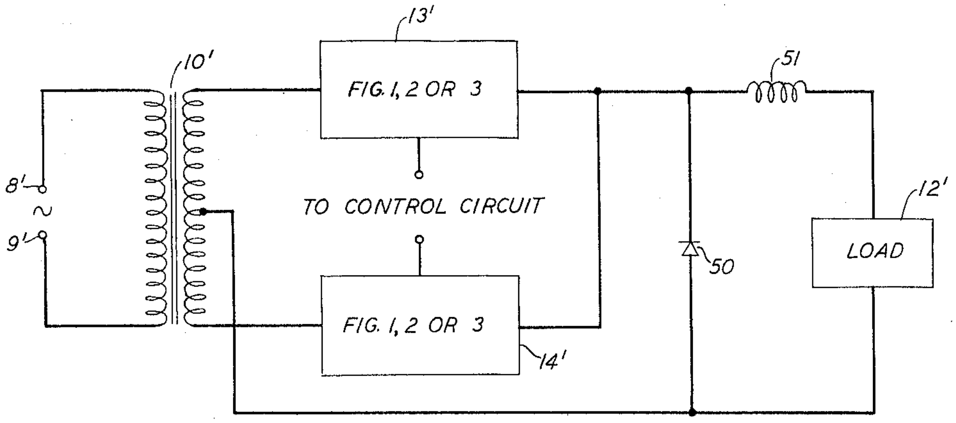
FIG. 4 is an illustrative application of FIGS. 1, 2 and 3.

It should be noted that with the exception of FIG. 4 the first digit of each component corresponds to the figure-number wherein that component made its first appearance. This notation used in connection with FIG. 4 shall be discussed in connection with that figure.

Figure 1:
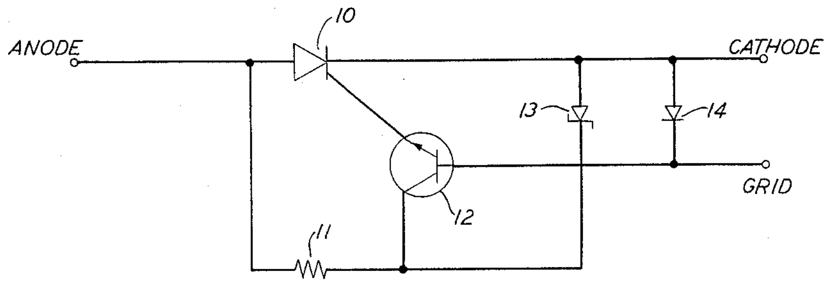
FIG. 1 is one embodiment of the invention.

FIGURE 1 of the drawing illustrates one form which the thyratron replacement phase controlled unit may take. In this embodiment of the invention, controlled rectifier 10 is serially connected between the anode and cathode terminals. The emitter of transistor 12 is connected to the gate lead of control rectifier 10. Resistor 11 is connected from the collector electrode of transistor 12 to the anode terminal, while Zener asymmetrically conducting device 13 is connected from the collector electrode of transistor 12 to the cathode terminal. Asymmetrically conducting device 14 is connected across the cathode and grid terminals.

The operation of the embodiment of the invention shown in FIG. 1 is as follows: When an alternating-current control signal of the proper polarity is applied across the grid-cathode terminals, such as, for example, as applied to the grid-cathode terminals of the thyratrons 13 and 14 of FIG. 2 of U.S. Patent 2,619,626, noted heretofore, transistor 12 is biased into conduction. The quiescent bias potential for transistor 12 is supplied by the voltage drop across the network comprising resistor 11 and Zener asymmetrically conducting device 13. A Zener asymmetrically conducting device is used both to clamp the collector voltage of transistor 12 to a stable quiescent bias voltage and to limit the inverse voltage appearing across the collector-emitter electrodes of transistor 12 when controlled rectifier 10 is "turned-off" (by a large inverse voltage). If a Zener asymmetrically conducting device were not used (i.e., a resistor inserted in its place) the inverse collector-emitter voltage rating of transistor 12 would have to be in the order of magnitude of the inverse controlled rectifier voltage rating. For most power supply applications this would require a specially manufactured, relatively expensive transistor. With Zener asymmetrically conducting device 13, however, inexpensive transistors which are rejected for other applications (for low gain, etc.) may be used. The use of Zener asymmetrically conducting device 13, therefore, results in a considerable saving. It should be obvious, however, that although a transistor is shown as the gating element in this preferred embodiment, an impedance element may be substituted therefor, although this will somewhat lower the performance level of the unit.

When transistor 12 is biased into conduction, in the manner discussed heretofore, the current through the collector-emitter path provides the gate current for controlled rectifier 10 which is now biased into conduction. As noted heretofore, controlled rectifier 10 is turned off by the inverse voltage appearing across it. Asymmetrically conducting device 14 is used to limit the reverse peak voltage appearing across the base-emitter electrodes of transistor 12.

Figure 2:
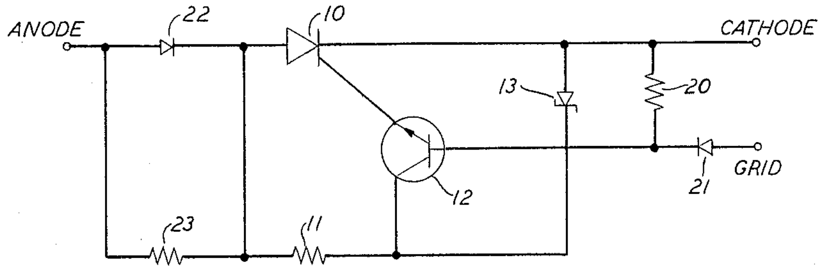
FIGS. 2 and 3 are second and third embodiments of the invention.

FIG. 2 of the drawings illustrates a second embodiment of the invention. The operation of the circuit of FIG. 2 is substantially the same as the operation of the circuit of FIG. 1 and is, therefore, not discussed further at this time. In this embodiment of the invention resistor 20 and asymmetrically conducting device 21 of FIG. 2 are substituted for asymmetrically conducting device 14 or FIG. 1 as an alternate scheme for protecting the base-emitter junction of transistor 12. The choice of schemes would depend upon the control circuitry used. Asymmetrically conducting device 22 is added in series with controlled rectifier 10 to share the inverse voltage appearing across controlled rectifier 10 in applications where excessive inverse voltages are inherent. The resistor 23 in combination with resistor 11 forces this inverse voltage sharing. Since the rating of resistor 11 is limited to values which will provide sufficient gate current through transistor 12 to "fire" and sustain controlled rectifier 10, most of the inverse voltage will be dissipated across resistor 23 hence requiring a relatively expensive, large power rated resistor.

Figure 3:
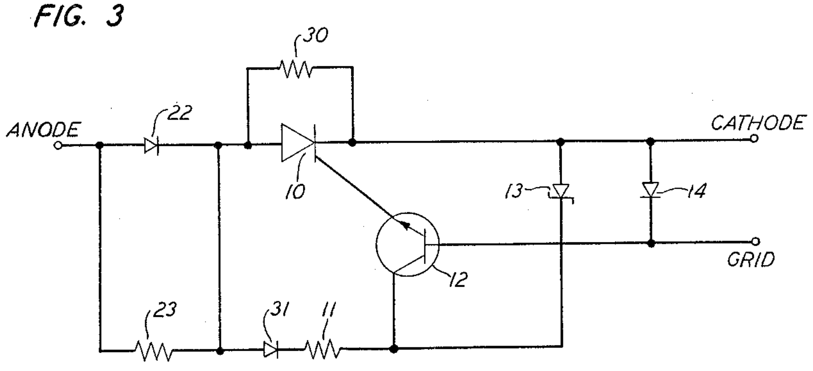

The circuit of FIG. 3 illustrates a third embodiment of the invention wherein an additional resistor 30 is added to eliminate the need for a large power rating for resistor 23. In this embodiment of the invention resistor 30 now shares the inverse voltage with resistor 23. The use of two inexpensive resistors in place of the relatively expensive, large power rated resistor results in a reduction of the over-all cost of the replacement unit. When one considers the enormous number of thyratrons in use in a telephone system, the large amount of savings achieved is apparent. Asymmetrically conducting device 31 is a blocking device which keeps the inverse voltages from appearing across resistor 11 for the reasons discussed heretofore. FIG. 3 is a preferred embodiment.

The circuit of FIG. 4 illustrates the application of a flyback asymmetrically conducting device 50 in accordance with an additional feature of the invention to an existing circuit in which the thyratron replacement units shown in FIGS. 1, 2, or 3 have been substituted for thyratron tubes. Such a circuit is shown in FIG. 2 of U.S. Patent 2,619,626 noted heretofore. The corresponding components of FIG. 2 of the reference patent are characterized in FIG. 4 by the same numerals (except for the prime) used in the patent, for example, the alternating-current input terminals 8′ and 9′, the transformer 10′, the thyratrons 13′ and 14′, and the load 12′. The other components of the reference patent are omitted for the sake of clarity.

Figure 5:
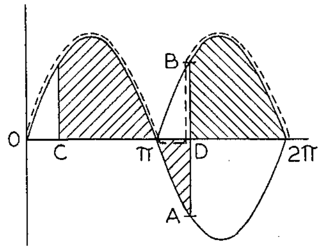
FIGS. 5 and 6 are illustrative of the principles of FIG. 4.

For most applications, it is necessary to introduce a filter choke in series with the load. Such a choke is shown as element 51 in FIG. 4. The addition of this element is necessary to show the function of the flyback asymmetrically conducting device 50 which can be best understood by referring to FIGS. 5 and 6. In FIG. 5 it is assumed that the phase control signal is such that the thyratron replacement unit corresponding to thyratron 13′ of the reference patent is fired at point C. Due to the phase lag between the input and control signal this unit will continue to conduct until point A is reached as shown by the shaded area which represents the volt-second output. At point A, the other thyratron unit corresponding to thyratron 14′ of the reference patent is fired by the control signal and the output potential immediately jumps from points A to B. The inherent characteristic of filter choke 51, however, is such as to keep the current flowing in the same direction through the choke 51. In accordance with this characteristic the flux surrounding the choke collapses and induces a large potential across the choke in order to sustain the current flow which is now in the opposite direction from the current flow through the conducting thyratron unit 14′. The induced counter potential in combination with the sudden jump from points A to B in the output voltage as shown in FIG. 5, is such as to apply a large inverse voltage across the turning off thyratron replacement unit which, in our example, is thyratron 13′. In addition to the large load transient voltages it has been found that this sudden jump in potential also causes damage to the controlled rectifier in the replacement units. With the addition of flyback asymmetrically conducting device 50 in accordance with a feature of the invention, however, this problem has been greatly alleviated. The effect of flyback asymmetrically conducting device can be seen from the dotted portion of FIG. 5. As shown in that figure at the point in time corresponding to $\pi$ radians, the flyback asymmetrically conducting device 50 is biased into conduction and clamps the voltage appearing across choke filter 51 and the load 12′ to the small forward voltage drop appearing across the asymmetrically conducting device 51. The energy in the filter inductor 51 now begins to discharge through asymmetrically conducting device 50 to keep the voltage across the load 12′ constant. This condition exists until the point ADB in time is reached and thyratron 14′ fires. Note that without the asymmetrically conducting device 50, the voltage jump was from A to B, whereas the jump now is half that, i.e., from D to B. For a typical 800-volt input (appearing across the secondary of transformer 10′) this represents a reduction of 400 volts.

Figure 6:
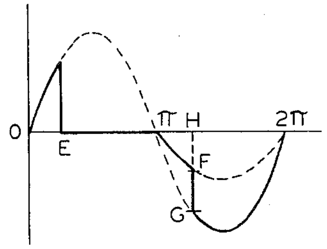

The flyback asymmetrically conducting device 50, featured by the invention, has an additional beneficial effect as can best be seen by referring to FIG. 6 which shows the voltage appearing across the thyratron replacement unit 13′. As illustrated, the potential builds up until point E is reached and the unit fires. The voltage drop across the unit while conducting, for all practical power systems applications, is zero. This condition exists until the $\pi$ radians point in time is reached and flyback asymmetrically conducting device 50 is biased into conduction. This is easily seen if it is remembered that the voltage drop across the thyratron unit 13′ is zero and at the $\pi$ radian point in time the potential at the top of the secondary winding of transformer 10′ is negative with respect to the center tap. The wave shape across the secondary winding is shown as the dotted wave shape of FIG. 6. Since the forward voltage drop across asymmetrically conducting device 50 is negligible the voltage appearing across the top half of the secondary winding of transformer 10′ (which is shown as the dotted wave shape which point F lies on) must appear across the thyratron unit 13′ as an inverse voltage. The inverse voltage follows the input wave shape and continues until the point HFG in time when thyratron 13′ is turned-off and thyratron 14′ is fired. The voltage jump across thyratron 13′ is now only from point F to point G. Assuming the 800-volt peak-to-peak typical value noted heretofore, there is a voltage jump of only 200 volts as opposed to the jump of 400 volts from H to G as would occur without the flyback asymmetrically conducting device 50. Thus, the flyback asymmetrically conducting device 50 serves many purposes. In accordance with this feature of the invention the inverse induction potentials are eliminated, load transients are reduced and control rectifier replacement units are protected.

It should be noted that although npn transistors are shown in the embodiments of FIGS. 1, 2 and 3, pnp transistors might be used equally as effectively, by merely interchanging the collector and emitter electrodes.

Since changes may be made in the above-described arrangements and different embodiments may be devised by those skilled in the art without departing from the spirit and scope of the invention, it is to be understood that the matter contained in the foregoing description and accompanying drawings is illustrative of the application of the principles of the invention and is not to be construed in a limiting sense.

What is claimed is:

1. A phase controlled thyratron tube replacement unit having anode, cathode and grid terminals, a pnpn device having first, second and control electrodes, a transistor having base, collector and emitter electrodes, impedance means, a Zener asymmetrically conducting device, means for connecting the first electrode of said pnpn device to said anode terminal, means for connecting the second electrode of said pnpn device to said cathode terminal, means for connecting the control electrode of said pnpn device to the emitter electrode of said transistor, means for connecting said impedance means between the anode terminal and the collector electrode of said transistor, means for connecting said Zener asymmetrically conducting device between the cathode terminal and the collector electrode of said transistor, means for connecting the base electrode of said transistor to the said grid terminal, a second asymmetrically conducting device, and means for connecting said second asymmetrically conducting device between said cathode and grid terminals.

2. A phase controlled thyratron tube replacement unit having anode, cathode and grid terminals, a pnpn device having first, second and control electrodes, a transistor having base, collector and emitter electrodes, a Zener asymmetrically conducting device, first and second asymmetrically conducting devices, first, second and third impedance means, means for connecting said first asymmetrically conducting device between said anode terminal and the first electrode of said pnpn device, means for connecting the second electrode of said pnpn device to said cathode terminal, means for connecting the emitter electrode of said transistor to the control electrode of said pnpn device, means for connecting said second asymmetrically conducting device between the base electrode of said transistor and said grid terminal, means for connecting said first impedance means across said first asymmetrically conducting device, means for connecting said second impedance means between the first electrode of said pnpn device and the collector electrode of said transistor, means for connecting said Zener asymmetrically conducting device between the second electrode of said pnpn device and the collector electrode of said transistor, and means for connecting said third impedance means between the second electrode of said pnpn device and the base electrode of said transistor.

3. A phase controlled thyratron tube replacement unit in accordance with claim 2 wherein said first, second and third impedance means are resistors.

4. A phase controlled thyratron tube replacement unit having anode, cathode and grid terminals, a pnpn device having first, second and control electrodes, a transistor having first, second and control electrodes, first and second impedance means, an asymmetrically conducting device, biasing means, means for connecting the control electrode of said transistor to said grid terminal, means for connecting the second electrode of said pnpn device to said cathode terminal, means for connecting the first electrode of said transistor to the control electrode of said pnpn device, means for connecting said biasing means between the second electrode of said transistor and the second electrode of said pnpn device, means for connecting said asymmetrically conducting device between the second electrode of said transistor and the first electrode of said pnpn device, means for connecting said first impedance means between said anode terminal and the first electrode of said pnpn device, and means for connecting said second impedance means across the first and second electrodes of said pnpn device whereby the inverse voltage appearing across the anode and cathode treminals is shared by said first and second impedance means.

5. A thyratron tube replacement unit in accordance with claim 4 wherein said first impedance means is the parallel combination of a resistor and an asymmetrically conducting device and said second impedance means is a resistor.

6. A thyratron tube replacement unit having anode, cathode and grid terminals, a pnpn device having first, second and control electrodes, a transistor having base, collector and emitter electrodes, first, second, and third asymmetrically conducting devices, a Zener asymmetrically conducting device, first, second, and third resistors, means for connecting said first asymmetrically conducting device between said anode terminal and the first electrode of said pnpn device, means for connecting the second electrode of said pnpn device to said cathode terminal, means for connecting the emitter electrode of said transistor to the control electrode of said pnpn device, means for connecting the base electrode of said transistor to said grid terminal, means for connecting said first resistor across said first asymmetrically conducting device, means for serially connecting said second asymmetrically conducting device and said second resistor between the first electrode of said pnpn device and the collector electrode of said transistor, means for connecting said Zener asymmetrically conducting device between the second electrode of said pnpn device and the collector electrode of said transistor, means for connecting said third asymmetrically conducting device between said cathode and grid terminals, and means for connecting said third resistor between the first and second electrodes of said pnpn device.

7. Voltage and current regulating means comprising a source of alternating-current potential having first, second and common terminals, a load, an asymmetrically conducting device, a filter choke, first and second semiconductor thyratron simulation units, each of said thyratron simulation units comprising a pnpn device having anode, cathode and control electrodes, a transistor having base, collector, and emitter electrodes, first, second, third, and flyback asymmetrically conducting devices, a Zener asymmetrically conducting device, first, second, and third resistors, means for connecting in each of said thyratron simulation units the control electrode of said pnpn device and the emitter electrode of said transistor, means for connecting said first asymmetrically conducting device in said first thyratron simulation units between the anode electrode of said pnpn device and the first terminal of said alternating-current source, means for connecting said first asymmetrically conducting device in said second thyratron simulation unit to the anode electrode of said pnpn device and the second terminal of said alternating-current source, means interconnecting the cathode electrodes of said pnpn devices of said first and second thyratron simulation units, means for connecting said first resistor across said first asymmetrically conducting device in each of said thyratron simulation units, means for serially connecting said second asymmetrically conducting device and said second resistor from the anode electrode of said pnpn device to the collector electrode of said transistor in each of said thyratron simulation units, means for connecting said Zener asymmetrically conducting device from the collector electrode of said transistor to the cathode electrode of said pnpn device in each of said thyratron simulation units, means for connecting said third resistor between the anode and cathode electrodes of said pnpn device in each of said thyratron simulation units, means for connecting said third asymmetrically conducting device between the cathode electrode of said pnpn device and the base electrode of said transistor in each of said thyratron simulation units, means for connecting said filter choke between the cathode electrodes of said pnpn devices and said load, means for connecting the common terminal of said source of alternating-current potential to said load, means for connecting said flyback asymmetrically conducting device across said filter choke and said load, and means for impressing a control signal between the base electrodes of said transistors and the cathode electrodes of said pnpn devices.

8. A semiconductor thyratron tube replacement unit which comprises anode, cathode, and grid terminals corresponding, respectively, to the anode, cathode, and grid electrodes of the thyratron tube to be replaced, a semiconductor controlled rectifier which has its own anode, cathode, and gate electrodes, means connecting said anode terminal to the anode electrode of said controlled rectifier, means connecting said cathode terminal to the cathode electrode of said controlled rectifier, a transistor having base, collector, and emitter electrodes, means connecting the collector electrode of said transistor to said anode terminal, means connecting the base electrode of said transistor to said grid terminal, means connecting the emitter electrode of said transistor to the gate electrode of said controlled rectifier, and a Zener diode interconnecting the collector electrode of said transistor and the cathode electrode of said controlled rectifier, said Zener diode being poled to limit the inverse potential across the collector-emitter electrodes of said transistor to the inverse Zener voltage of said diode and to provide quiescent bias for said transistor.

References Cited by the Examiner

UNITED STATES PATENTS

| | | | |
|---|---|---|---|
| 3,018,432 | 1/1962 | Palmer | 323—22 X |
| 3,131,318 | 4/1964 | Snyder et al. | 307—88.5 |
| 3,175,166 | 3/1965 | Bird | 307—88.5 |

OTHER REFERENCES

A Survey of Some Circuit Applications of the Silicon Controlled Switch and Silicon Controlled Rectifier. Applications and Circuit Design Notes, Bulletin D420–02, September 1960, Solid State Products, Inc., pp. 22–23.

LLOYD McCOLLUM, *Primary Examiner.*